(12) United States Patent
Shi

(10) Patent No.: US 12,409,798 B2
(45) Date of Patent: *Sep. 9, 2025

(54) POWERBLOCK FOR ELECTRICALLY POWERING EQUIPMENT IN A VEHICLE

(71) Applicant: Absolute Health & Performance, Inc., Austin, TX (US)

(72) Inventor: Roy Ruijia Shi, Austin, TX (US)

(73) Assignee: Absolute Health & Performance, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,694

(22) Filed: Jun. 28, 2024

(65) Prior Publication Data

US 2024/0351540 A1 Oct. 24, 2024

Related U.S. Application Data

(63) Continuation of application No. 18/146,860, filed on Dec. 27, 2022, now Pat. No. 12,049,180.

(51) Int. Cl.
| | |
|---|---|
| *B60R 16/033* | (2006.01) |
| *B60R 16/04* | (2006.01) |
| *H02J 3/38* | (2006.01) |
| *H02J 7/00* | (2006.01) |
| *H02J 7/35* | (2006.01) |

(52) U.S. Cl.
CPC ............ *B60R 16/033* (2013.01); *B60R 16/04* (2013.01); *H02J 3/381* (2013.01); *H02J 7/0031* (2013.01); *H02J 7/0042* (2013.01); *H02J 7/0047* (2013.01); *H02J 7/35* (2013.01); *H02J 2207/20* (2020.01); *H02J 2300/26* (2020.01)

(58) Field of Classification Search
CPC ....... B60R 16/033; H02J 3/381; H02J 7/0042; H02J 7/35; H02J 2207/20; H02J 2300/26
See application file for complete search history.

(56) References Cited

U.S. PATENT DOCUMENTS

| | | |
|---|---|---|
| 12,049,180 B2 * | 7/2024 | Shi ........................ H02J 7/0031 |
| 2007/0252435 A1 | 11/2007 | Coe et al. |
| 2013/0241306 A1 | 9/2013 | Aber et al. |
| 2020/0177008 A1 | 6/2020 | Tiedtke et al. |
| 2022/0109317 A1 | 4/2022 | Tiedtke et al. |

\* cited by examiner

*Primary Examiner* — Rexford N Barnie
*Assistant Examiner* — Duc M Pham
(74) *Attorney, Agent, or Firm* — KLEMCHUK PLLC

(57) ABSTRACT

A mobile power system for electrically powering equipment in a vehicle, where the system contains two electrical circuits operating at two different voltages. One of the two circuits is for providing power to and using power from the batteries onboard the mobile power system, and the other of the two circuits is for providing power to and using power from the vehicle battery. Voltage converting chargers couple the two circuits so that an external source power supply can flow to both electrical circuits, power can flow from one circuit to the other, power can flow from either or both of the two circuits to a combination inverter charger in the mobile power system, or a combination thereof.

20 Claims, 8 Drawing Sheets

POWERBLOCK FOR ELECTRICALLY POWERING EQUIPMENT IN A VEHICLE

The present application is a continuation of U.S. application Ser. No. 18/146,860, filed Dec. 27, 2022, which is incorporated by reference for all purposes.

The present disclosure generally relates to mobile power systems that supply electrical power to equipment in a vehicle.

BACKGROUND

Mobile service and product providers can utilize a vehicle to provide the mobile service or product. Examples of these vehicles are food trucks and mobile medical vehicles having medical equipment. These vehicle can include equipment contained within the vehicle that require electrical power to provide the service and/or to make the product. In cases where the power provided by the vehicle itself (e.g., from the alternator run by an internal combustion engine (ICE), from the battery in an ICE vehicle, or from a battery pack in an electric vehicle to power electric motors) is not enough to power the equipment, the mobile service and product provider can supplement and/or replace the vehicle power with other sources of power, such as fuel driven generators or additional batteries dedicated to power the equipment. When batteries are used, a battery cage holds the batteries so that the batteries do not move when the vehicle moves. The batteries and battery cage are typically located under the floor of the vehicle. The batteries are not easily accessible for maintenance and/or replacement, and cannot be moved from vehicle to vehicle.

There is a need for a mobile power system to power equipment in vehicles.

SUMMARY

In some aspects, the techniques described herein relate to a mobile power system for equipment in a vehicle, including: a base; a battery pack including a plurality of rechargeable batteries placed on the base; an equipment cage connected to the base, wherein the equipment cage includes a mounting member; a circuit board connected to the equipment cage above the battery pack, wherein the circuit board includes a first electrical circuit operating at a first voltage, a second electrical circuit operating at a second voltage, and a plurality of chargers, wherein each of the plurality of chargers is electrically connected to the first electrical circuit and to the second electrical circuit, wherein the battery pack is electrically coupled to the first electrical circuit, wherein the second electrical circuit is configured to electrically connect to a vehicle battery; and a combination inverter charger placed on a mounting member of the equipment cage above the battery pack and to a side of the circuit board, wherein the combination inverter charger is electrically connected to the first electrical circuit and is configured to i) provide a first voltage power supply to charge the plurality of rechargeable batteries in the battery pack via the first electrical circuit, ii) receive a battery pack power supply from the battery pack via the first electrical circuit, and iii) provide a first 120V power supply to the equipment in the vehicle.

In some aspects, the techniques described herein relate to a mobile power system for equipment in a vehicle, including: a base; a battery pack including a plurality of rechargeable batteries placed on the base; an equipment cage connected to the base, wherein the equipment cage includes a mounting member; a 3D circuit board connected to the equipment cage above the battery pack, wherein the 3D circuit board includes a first voltage bus bar, wherein the battery pack is electrically coupled to the first voltage bus bar; and a combination inverter charger placed on a mounting member of the equipment cage above the battery pack and to a side of the 3D circuit board, wherein the combination inverter charger is electrically connected to the first voltage bus bar of the 3D circuit board and is configured to i) receive a first 120V power supply from a grid connection or from a generator, ii) provide a first voltage power supply to the first voltage bus bar, and iii) provide a second 120V power supply.

In some aspects, the techniques described herein relate to a mobile power system for equipment in a vehicle, including: a base; a battery pack including a plurality of rechargeable batteries placed on the base; an equipment cage connected to the base, wherein the equipment cage includes a mounting member; a 3D circuit board connected to the equipment cage above the battery pack, wherein the 3D circuit board has a 24V bus bar, wherein the battery pack is electrically coupled to the 24V bus bar; and a combination inverter charger placed on a mounting member of the equipment cage above the battery pack and to a side of the 3D circuit board, wherein the combination inverter charger is electrically connected to the 24V bus bar of the 3D circuit board and is configured to i) receive a first 120V power supply from a grid connection or from a generator, ii) provide a 24V power supply to the 24V bus bar, and iii) provide a second 120V power supply.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

As used herein, the term "3D" refers to three dimensional. In context of the 3D circuit board disclosed herein, "3D" means that at least some wiring extends in a Z dimension between two planes of the circuit board that extend in the X and Y dimensions (referred to herein as upper board and lower board). These dimension are relative to a top view of the mobile power system.

Disclosed is a mobile power system, also referred to herein as a powerblock. The powerblock is a multi-level fully integrated power system that can be installed in a vehicle within the footprint of a seat in the vehicle. The powerblock includes a battery pack having at least one battery, an equipment cage, a circuit board, and a combination inverter charger. The power block can be mounted to vehicle seat mounts in a vehicle, and thus, the batteries in the powerblock are above the floor of the vehicle and are contained in the powerblock itself, providing mobility easy access for maintenance or replacement of the batteries. Moreover, the powerblock can be mounted to different seat locations in the vehicle or moved from one vehicle to another (e.g., when a vehicle is totaled in a crash but the powerblock can continue to be used in a replacement vehicle), while maintaining the ability of the powerblock to be charged from multiple power sources and to provide a power supply to equipment in the vehicle, in one small and consolidated footprint.

FIGS. 1 to 6 show the mobile power system 1000 without wiring in between the components, for clarity. The electric connections between various components are described herein, and in practice, the electrical connection between any two components can be made with copper wire or other industry-accepted electrically conducting wire having any industry-standard AWG, such as 10 AWG, 8 AWG, 2 AWG, or combinations thereof.

The mobile power system 1000 contains two circuits operating at two different voltages. One of the two circuits is for providing power to and using power from the batteries onboard the mobile power system 1000, and the other of the two circuits is for providing power to and using power from the vehicle battery (e.g., a battery for an ICE vehicle or a battery pack for an electric vehicle). Voltage converting chargers couple the two circuits so that 1) outside source power supply can flow to both electrical circuits, 2) power can flow from one circuit to the other, 3) power can flow from either or both of the two circuits to a combination inverter charger to provide a 120V power supply, or a combination thereof. For description purposes, the two circuits will be described below as a 12V circuit operating at 12 volts and a 24V circuit operating at 24 volts. In practice, a mobile power system 1000 can be manufactured with two circuits having other voltages, and the scope of this application is not limited only to a combination of a 12V circuit and a 24V circuit.

Figure 1:
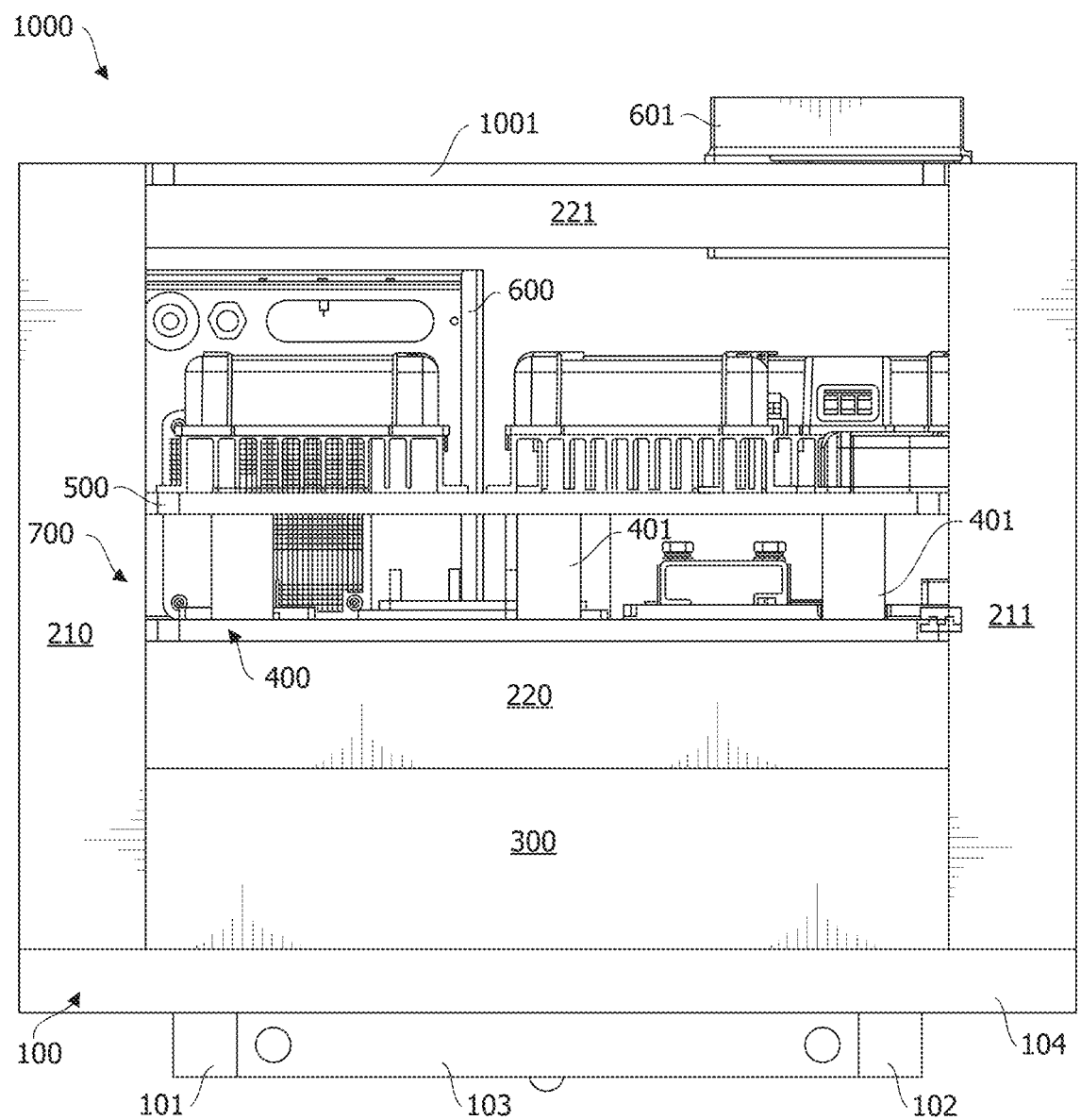
FIG. 1 illustrates a side elevational view of the disclosed mobile power system.
Figure 2:
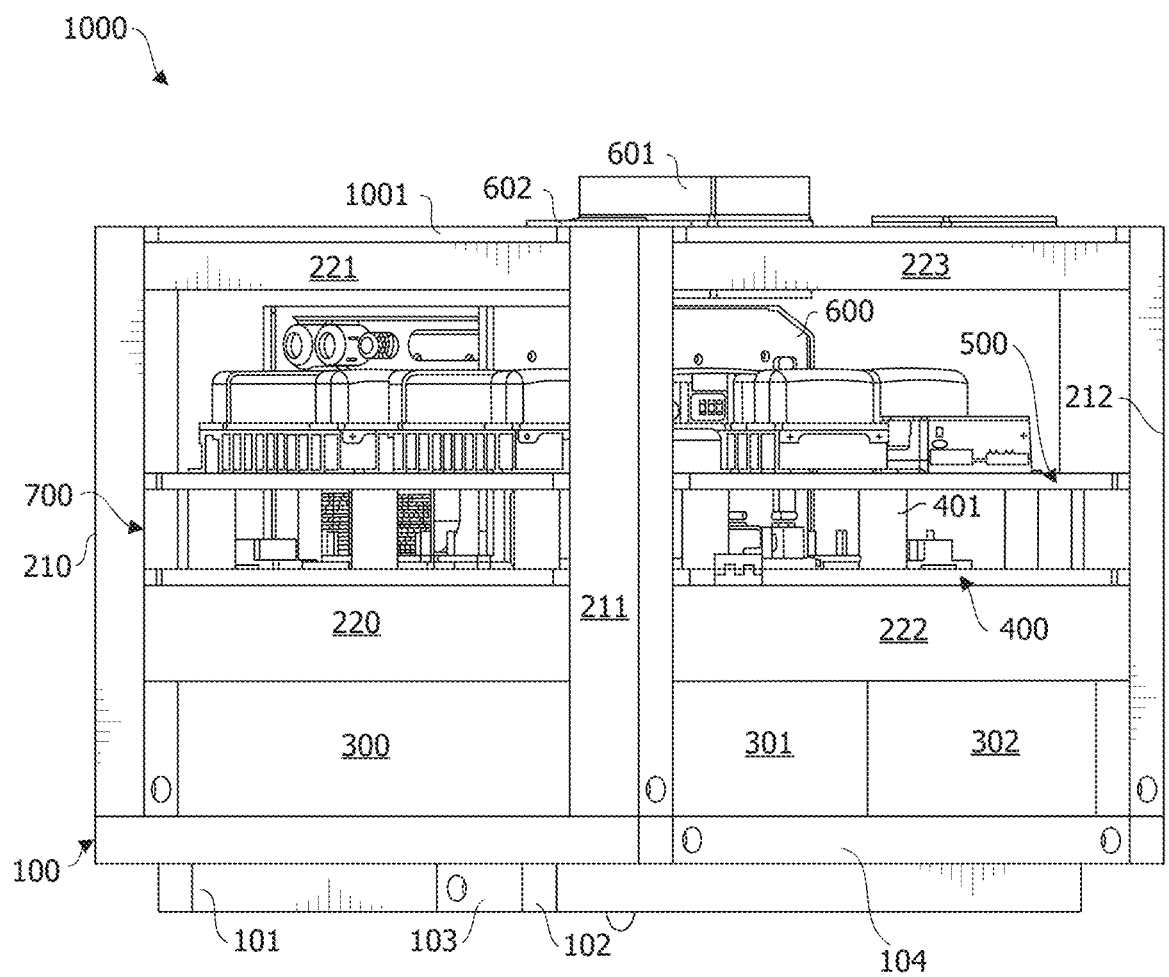
FIG. 2 illustrates a corner elevational view of the mobile power system.

FIG. 1 illustrates a side elevational view of the disclosed mobile power system 1000, and FIG. 2 illustrates a corner elevational view of the mobile power system 1000. The following description applies to both FIG. 1 and FIG. 2.

The mobile power system 1000 includes a base 100, an equipment cage 200, a battery pack 300, a combination inverter charger 600, and a circuit board 700.

The base 100 is configured to support the components of the mobile power system 1000 on top of the base 100, and configured to connect to a seat mount of a vehicle on bottom of the base 100. For connection to one or more seat mounts, the base 100 has first member 101 that is parallel with a second member 102, with a cross member 103 extending between and connected to each of the first member 101 and the second member 103. In aspects, the base 100 can be installed and secured into seat mounts of a vehicle using NTSB crash tested mounting hardware. A flat plate 104 of the base 100 is placed on top of the first member 101, the second member 102, and the cross member 103. The flat plate 104 provides the surface on which the other components of the mobile power system 1000 are placed.

The equipment cage 200 is connected to the base 100. The equipment cage 200 comprises horizontal members (e.g., members 220, 221, 222, and 223) and vertical members (e.g., 210, 211, and 212). Each of the horizontal members connects to two of the vertical members. Each of the members (e.g., members 210, 211, 212, 220, 221, 222, and 223) can be formed of tubular metal and arranged to hold within the equipment cage 200 and to protect the electrical components of the mobile power system 1000 from movement and external impact. More details about the arrangement of the members of the equipment cage 200 is described for and illustrated in FIG. 3.

That battery pack 300 is placed on the top of the base 100. The battery pack 300 can contain at least one battery. Each battery can be referred to as a battery cell, or each battery can contain multiple battery cells. In FIG. 1 the battery pack contains two batteries 301 and 302. In aspects, the batteries 301 and 302 in the battery pack 300 are rechargeable. Suitable rechargeable batteries include lithium polymer (LiPO) batteries, lithium ion (Li-ion) batteries, nickel cadmium (NiCd) batteries, nickel metal hydride (NiMH) batteries, or combinations thereof. The batteries 301 and 302 of the battery back can be of any voltage, such as 12V or 24V. While the batteries 301 and 302 can be of any voltage that is the voltage of the first electrical circuit on the circuit board 700.

The circuit board 700 is connected to the equipment cage 200 above the batter pack 300. The circuit board 700 has at least two electrical circuits, where the at least one electrical circuit has a different voltage than at least another electrical circuit. For example, the circuit board 700 can have wiring and components for a 12V circuit and a 24V circuit. In aspects, the circuit board 700 is a 3D circuit boarding having at least two levels, e.g., a lower board 400 and an upper board 500. Each of the two electrical circuits can utilize one or more of the levels. For example, at least a portion of the first electrical circuit can have electrical components on one or both of the lower board 400 and the upper board 500, and at least a portion of the second electrical circuit can have electrical components on one or both of the lower board 400 and the upper board 500.

The lower board 400 and the upper board 500 are separated by spacers 401 that are positioned between the lower board 400 and the upper board 500. Each of the spacers 401 has a height suitable for clearance of the electrical components on the lower board 400 under the upper board 500. In aspects, the spacers 401 can be 3D printed. The spacers 401 are generally formed of a material that is not electrically conductive, such as wood, glass, or polymer. Each spacer 401 can have an end connected (e.g., via bolt or adhesive or friction) to the lower board 400 and an opposite end connected (e.g., via bolt or adhesive or friction) to the upper board 500. The spacers 401 can have any three-dimensional shape such as cylindrical or cuboid. The electrical components on the lower board 400 are described in the description for FIG. 4, and the electrical components of the upper board 500 are described in the description for FIG. 5.

In aspects, the lower board 400 and the upper board 500 can each be formed of machined wood or polymer, with holes formed in locations and configured to allow wires to pass through the holes, the wires connecting electrical components of the lower board 400 to electrical components of the upper board 500 in one of the electrical circuits. The electrical components of the circuit board 700 are connected by wires that are not encased in the circuit board 700. Moreover, it should be noted that the circuit board 700 is not made from silicon wafers. That is, the circuit board 700 is not comparable with a silicon wafer based chipset at least because the circuit board 700 is not formed using silicon wafers and because the wires connecting electrical components on the circuit board 700 are not encased in the circuit board 700.

Figure 6:
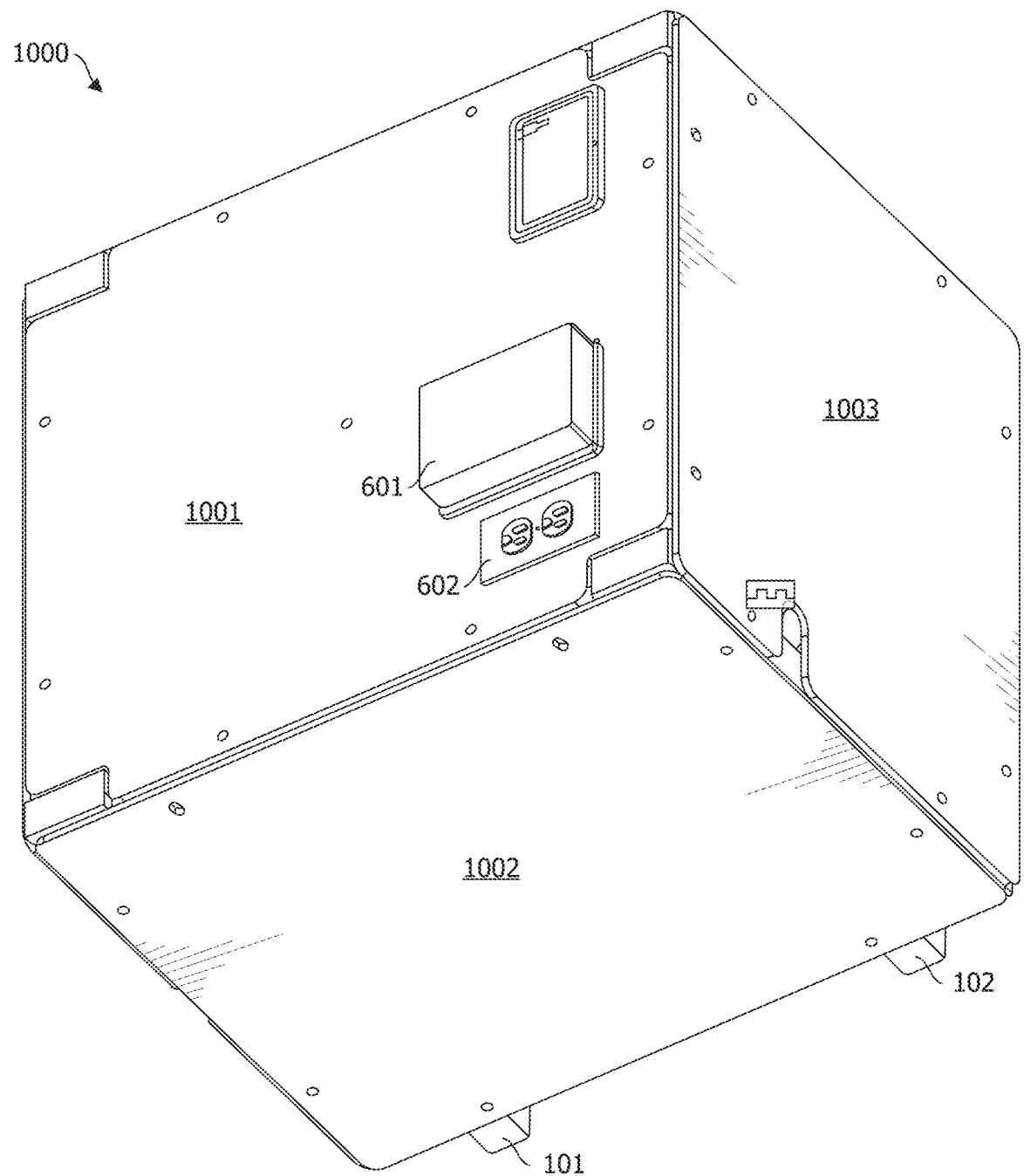
FIG. 6 illustrates a perspective view of the mobile power system with walls enclosing the cage, the battery pack, the combination inverter charger, and the 3D circuit board.

The combination inverter charger 600 is configured to receive a 120V power supply from a grid connection or from a generator, to provide a 24V power supply to the circuit board 700, and to provide a 20V power supply to equipment in the vehicle that is connected to a 120V outlet of the mobile power system 1000 (e.g., see outlet 602 in FIG. 6). The combination inverter charger 600 is placed on the equipment cage 200 above the battery pack 300 and to the side of the 3D circuit board 700. When grid or generator power is disconnected from the mobile power system 1000, the inverter within the combination inverter charger 600 can be activated to take over the supply of electric power to the connected equipment from the battery pack 300. An example of a combination inverter charger 600 is the MULTIPLUS® combination inverter charger available from Victron Energy.

The mobile power system 1000 can also include a top cover 1001 having a circuit breaker 601 and a 120V outlet 602 placed therein. The circuit breaker 601 is configured to connect or disconnect the combination inverter charger 600 from a first 120V power supply (e.g., see grid 701 or generator 702 in FIG. 7), wherein the 120V outlet 602 is electrically connected to the combination inverter charger 600 and configured to receive a 120V power supply from the combination inverter charger 600.

Figure 3:
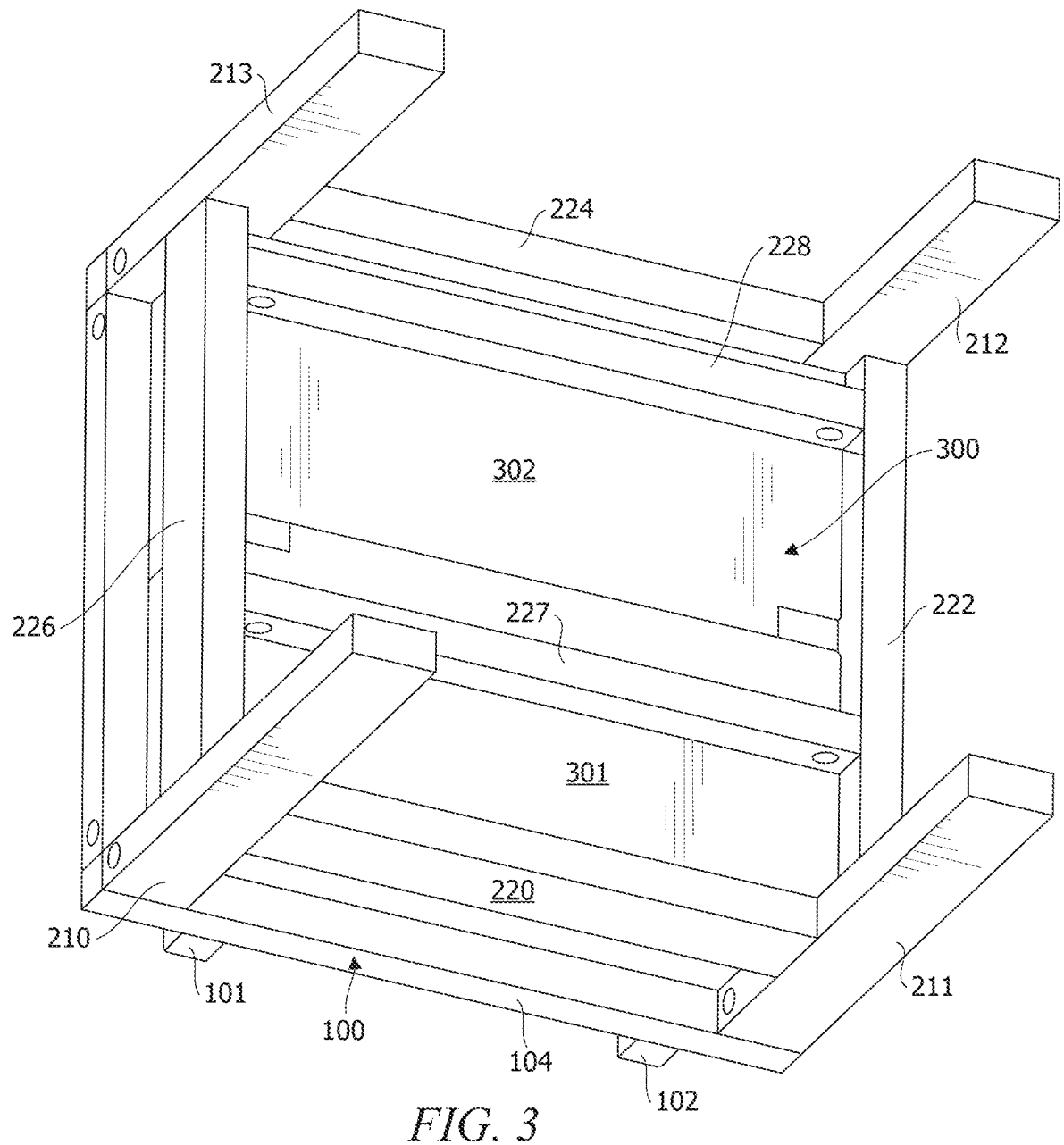
FIG. 3 illustrates a top perspective view of the base, battery pack, and cage of the mobile power system.

FIG. 3 illustrates a top perspective view of the base 100, the equipment cage 200, and battery pack 300 of the mobile power system 1000. The batteries 301 and 302 of the battery pack 300 are on top of the flat plate 104 of the base. The vertical members 210, 211, 212, and 213 are placed in the corners of the flat plate 104 of the base 100. The horizontal members 220, 222, 224, and 226 can be as each being connected to two vertical members, e.g., horizontal member 220 has an end connected to vertical member 210 and an opposite end connected to vertical member 211, horizontal member 222 has an end connected to vertical member 211 and an opposite end connected to vertical member 212, horizontal member 224 has an end connected to vertical member 212 and an opposite end connected to vertical member 213, and horizontal member 226 has an end connected to vertical member 213 and an opposite end connected to vertical member 210. Mounting members 227 and 228 can be seen extending between a parallel pair of the horizontal members 222 and 226. The combination inverter charger 600 can be placed on the mounting members 227 and 228, and mounting members 227 and 228 function as structural support for the combination inverter charger 600 and to protect the battery pack 300 that is below the mounting members 227 and 228 from the weight of the combination inverter charger 600.

Figure 4:
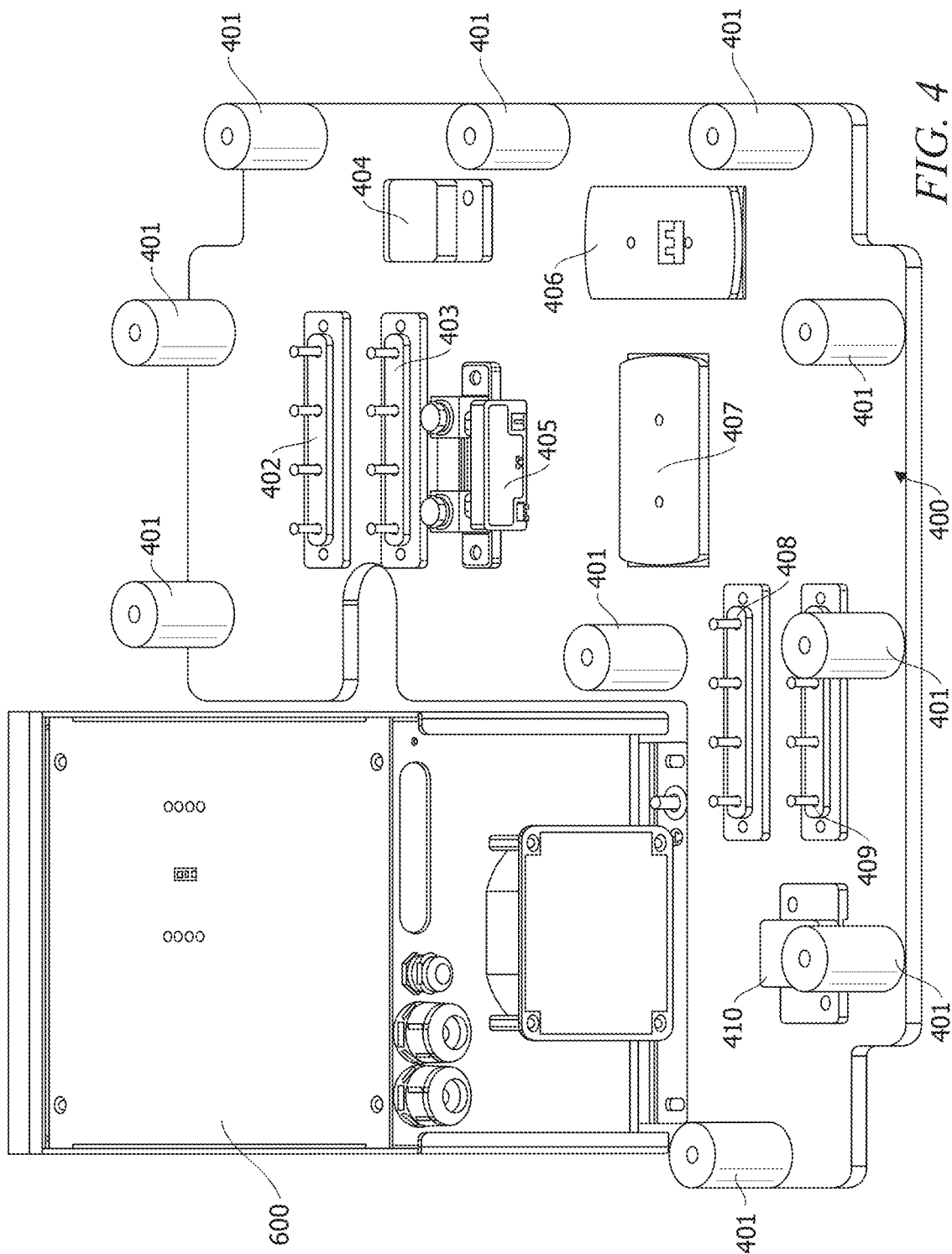
FIGS. 4 and 5 illustrate isolated perspective views of a lower board and upper board of the circuit board of the mobile power system, when the circuit board is embodied as a 3D circuit board.
Figure 5:
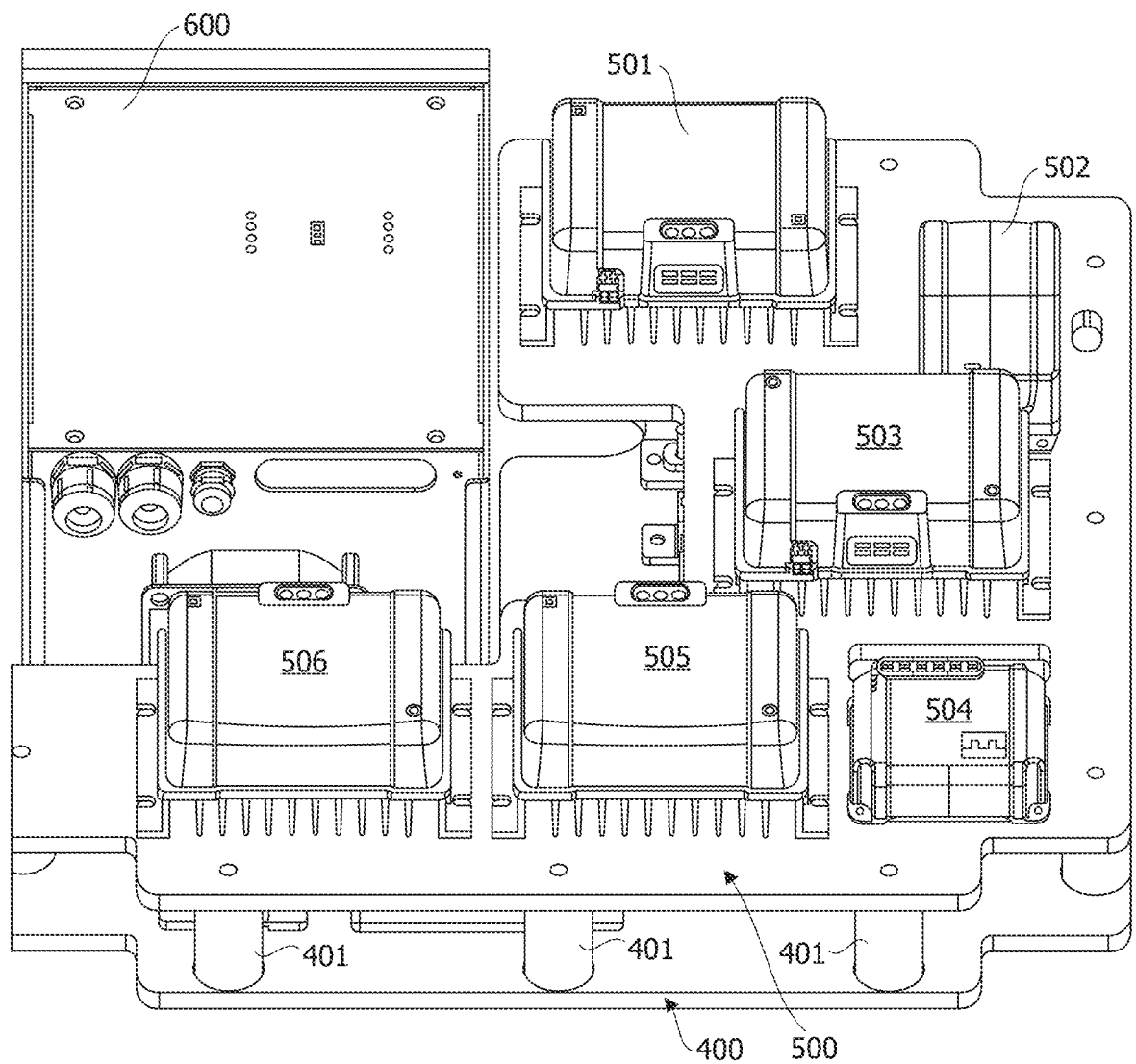

FIGS. 4 and 5 illustrate isolated perspective views of a lower board and upper board of the circuit board, when the circuit board is embodied as a 3D circuit board.

In FIG. 4, the combination inverter charger 600 be seen placed to the side of the lower board 400. Spacers 401 can be seen placed on the perimeter of the lower board 400 and configured with a height that provides a vertical clearance of all the electrical components mounted and connected to the lower board 400.

The lower board 400 can include one or more 12V bus bars 402, 403, 408, and 409, a circuit breaker 404, a battery monitor device 405, one or more dual 24V bus bars 406 and 407, and circuit breaker 410 that are mounted, attached, connected, or otherwise coupled to the lower board 400.

Four 12V bus bars 402, 403, 408, and 409 are illustrated in FIG. 4. The 12V bus bars electrically connect electrical components in the 12V circuit of the 3D circuit board 700. One or more of the 12V bus bars 402, 403, 408, and 409 is/are electrically connected to a vehicle battery of the vehicle in which the mobile power system 1000 is contained. One or more of the 12V bus bars 402, 403, 408, and 409 is/are additionally electrically connected to chargers (e.g., chargers 501, 503, 505, and 506) that are located in the upper board 500 (described in more detail below).

The circuit breaker 404 electrically connects the battery pack 300 to the 24V circuit (e.g., via one or more of the 24V bus bars 406 and 407). The circuit breaker 404 is configured to disconnect the battery pack 300 from the 24V circuit upon a circuit breaking condition, such as a power surge.

The battery monitor device 405 is electrically connected to the 24V circuit via one or more of the 24V bus bars 406 and 407. The battery monitor device 405 is also operably connected to a control computer on the upper board 500 (described in more detail herein). The battery monitor device 405 can be configured to monitor parameters of the batteries 301 and 302 in the battery pack 300, such as the state of charge, the time to go, historical information, or combinations thereof. The battery monitor device 405 can additionally be configured to send a signal to the control computer on the upper board 500, where the signal represents a status of each battery of a status of the battery pack 300, or the status of the battery pack 300. In aspects, the battery monitor device 405 can include a shunt coupled with a computer that the current and voltage across the shunt. When the mobile power system 1000 is not connected to an outside power source (e.g., grid 701 or generator 702), the batteries in the battery pack 300 provide power to the 24V circuit, and the voltage and current of the power are determined by the computer connected to the shunt of the battery monitor device 405. The computer of the battery monitor device 405 can be equipped with a communication device, such as a transceiver, to communicate with a mobile device of a user via Bluetooth or wireless signal, for example. An example of the battery monitor device 405 is the SMARTSHUNT® available from Victron Energy.

Two dual 24V bus bars 406 and 407 are illustrated in FIG. 4. The 24V bus bars 406 and 407 electrically connect electrical components in the 24V circuit of the 3D circuit board 700. One or more of the 24V bus bars 406 and 407 is electrically connected to the combination inverter charger 600, to receive a 24V power supply from the combination inverter charger 600 for charging the battery pack 300 and/or the vehicle battery and to provide a 24V power supply to the combination inverter charger 600 when using the battery pack 300 as power supply to the 120V electrical outlet 602 that is electrically connected to the combination inverter charger 600. One or more of the 24V bus bars 406 and 407 of the lower board 400 is/are additionally configured to electrically connect to the chargers (e.g., chargers 501, 503, 505, and 506 in FIG. 5) of the upper board 500.

The circuit breaker 410 electrically connects the vehicle battery of the vehicle to the 12V circuit (e.g., via one or more of the 12V bus bars 402, 403, 408, and 409). The circuit breaker 410 is configured to disconnect the vehicle battery from the 12V circuit upon a circuit breaking condition, such as a power surge.

In FIG. 5, the combination inverter charger 600 be seen placed to the side of the upper board 500. The upper board 500 can include chargers 501, 503, 505, and 506, a control computer 502, and a solar charge controller 504.

Chargers 501, 503, 505, and 506 can be configured as DC-DC chargers. In aspects, the chargers 501, 503, 505, and 506 can be 3-stage chargers. In aspects, the chargers 501 and 503 are first voltage to second voltage chargers, and the chargers 505 and 506 are second voltage to first voltage chargers. For example, chargers 501 and 503 can be 24V to 12V chargers, and chargers 505 and 506 can be 12V to 24V chargers. Each charger is configured to receive an input power supply at one voltage and to convert the input power supply to an output power supply at another voltage. The direction of power conversion through the chargers depends on whether a battery is being charged or used for power. Each charger is configured to connect to the first electrical circuit and the second electrical circuit, the first electrical circuit having a first voltage and the second electrical circuit having a second voltage. An example of first voltage to second voltage chargers 501/503 and second voltage to first voltage chargers 505/506 is the ORION® Tr Smart DC-DC Charger available from Victron Energy.

Using 24V and 12V as reference for the first voltage and the second voltage, respectively, the 12V to 24V charger(s) 505/506 are electrically connected to one or more of the 24V bus bars 406 and 407 and to one or more of the 12V bus bars 402, 403, 408, and 409. The 12V to 24V charger(s) 505/506 are configured to receive a 12V power supply from the vehicle battery via the 12V bus bar(s) 402, 403, 408, and 409, and to convert the received 12V power supply to an output 24V power supply. The output 24V power supply that is output by the 12V to 24V charger(s) 505/506 can be used to 1) charge the batteries 301 and 302 in the battery pack 300 via a 24V bus bar, 2) provide a 24V power supply to the combination inverter charger 600 via a 24V bus bar, which then converts the 24V power supply to a 120V power supply to the 120V electrical outlet 602, or both 1) and 2).

Using 24V and 12V as reference for the first voltage and the second voltage, respectively, the 24V to 12V charger(s) 501/503 are electrically connected to one or more of the 24V bus bars 406 and 407 and to one or more of the 12V bus bars 402, 403, 408, and 409. The 24V to 12V charger(s) 501/503 are configured to receive a 24V power supply from the 24V bus bar(s) 406 and 407 of the lower board 400 (which receives the 24V power supply from the battery pack 300 and/or the combination inverter charger 600), and to convert the received 24V power supply to an output 12V power supply. The output 12V power supply that is output by the 24V to 12V chargers 501/503 can be used to charge the vehicle battery via the 12V bus bar.

The control computer 502 is positioned on the upper board 500. The control computer 502 is electrically connected to one or more of the 24V bus bars 406 and 407 in the lower board 400 and operably connected to the combination inverter charger 600. The control computer 502 can be configured to monitor the state of charge of batteries 301 and 302 in the battery pack 300, monitor power consumption of equipment connected to the mobile power system 1000, monitor power harvest (e.g., from PV, generator, and mains), monitor tank levels, track temperature measurements, control the shore power input current limit, change settings of the mobile power system 1000, perform diagnostic tests, or combinations thereof. In aspects, the control computer 502 is configured to monitor a plurality of parameters of the combination inverter charger 600. An example of a control computer 502 is the CERBO GX® available from Victron Energy.

The control computer 502 is configured to wirelessly connect with a mobile device for monitoring and/or changing parameters of operation of the mobile power system 1000 via user input into the wirelessly connected mobile device.

The control computer 502 on the upper board 500 is operably connected to the battery monitor device 405 on the lower board 400. The control computer 502 is configured to receive a signal from the battery monitor device 405, the signal indicating a battery status. The control computer 502 can be configured to store and track battery status over time, and to generate a report of battery status upon from a mobile device that is wirelessly connected to the control computer 502.

The solar power controller 504 can be positioned on the upper board 500. The solar charge controller 504 is electrically connected to one of the 24V bus bars 406 and 408 on the lower board 400 and operably connected to the control computer 502. The solar charge controller 504 can be configured to i) receive a solar power supply from a solar panel, ii) control a flow of 24V power supply to the 24V bus bar, and iii) send a signal to the control computer 502 that indicates solar power usage over time and to track the solar power usage of the mobile power system 1000. In aspects, the solar charge controller 504, also known as a solar regulator, can be configured to regulate the power supplied by any solar panels that are connected to the mobile power system 1000. The solar charge controller 504 is configured to regulate charging of the batteries 301 and 302 in the battery pack 300 using solar power received at the solar charge controller 504 from a solar panel that is connected to the solar charge controller 504. The solar charge controller 504 can ensure a 24V power supply from the solar charge controller 504 does not overcharge the batteries 301 and 302. An example of a solar charge controller 504 is the SMARTSOLAR MPPT® Charge Controller available from Victron Energy.

FIG. 6 illustrates a perspective view of the mobile power system 1000 with walls 250, 251, 252, and 253. The walls 250, 251, 252, and 253 are side walls attached to a perimeter of the equipment cage 200. The side walls 250/251/252/253, the top cover 1001, and the base 100 are configured to enclose the battery pack 300, the combination inverter charger 600, and the circuit board 700.

It can be seen in FIG. 6 that the mobile power system 1000 has a square footprint. It is contemplated that the mobile power system 1000 can have other footprint shapes, such as circular, oval, triangular, or otherwise polygonal.

The dimensions of the mobile power system 1000 are configured so that the mobile power system 1000 can fit within the footprint of a seat of a vehicle. In aspects, the length of the mobile power system 1000 can be in a range of from 1 foot to 3 feet; the width of the mobile power system 1000 can be in a range of from 1 foot to 3 feet; and the height of the mobile power system 1000 can be in a range of from 1 foot to 5 feet. An example size of the mobile power system 1000 is 2 ft in length, 2 ft in height, and 2 ft in width.

Figure 7:
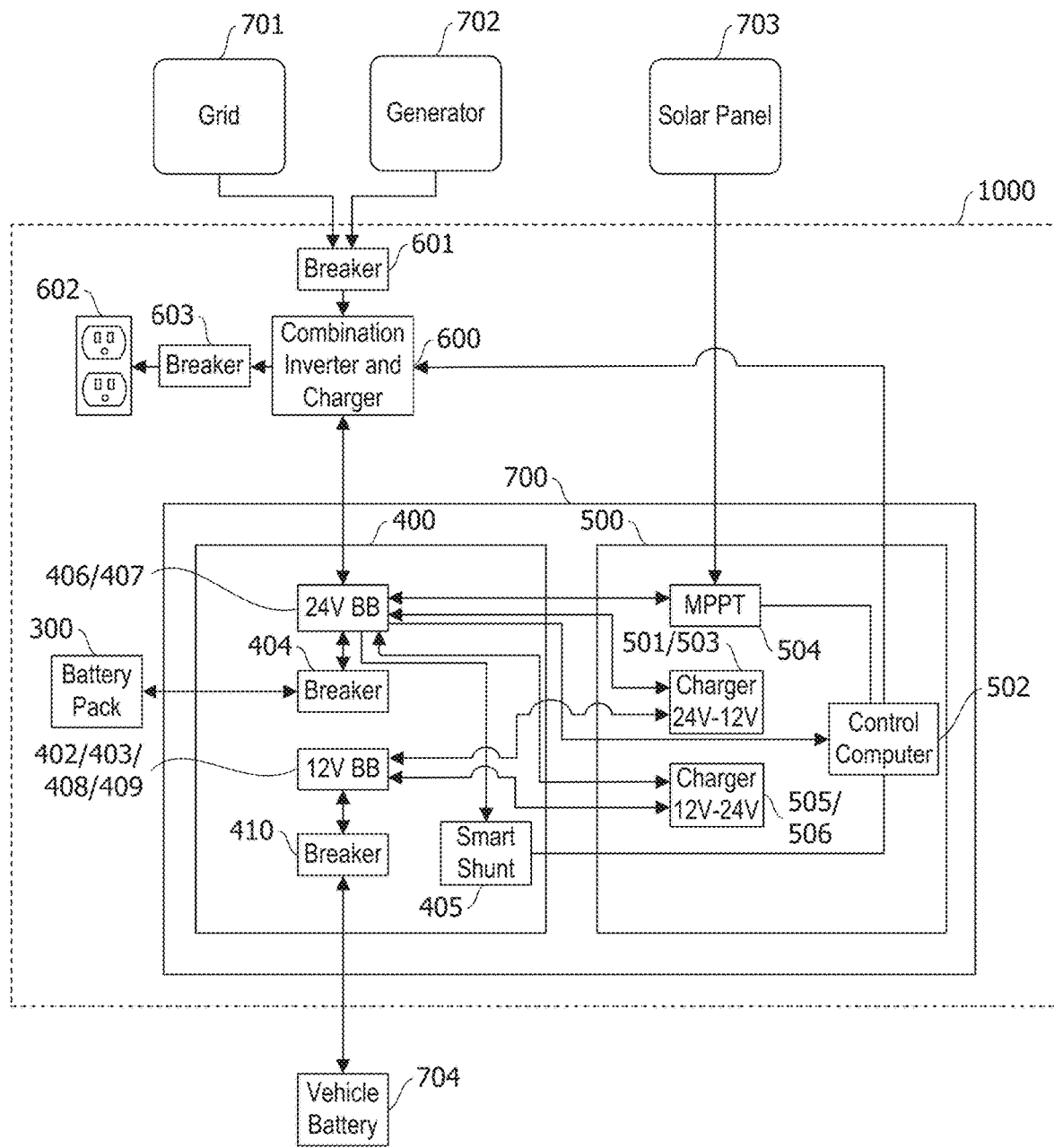
FIG. 7 illustrates a wiring diagram of the mobile power system in FIGS. 1 to 6.

FIG. 7 illustrates a wiring diagram of the mobile power system 1000 in FIGS. 1 to 6. The 3D circuit board 700 can be seen with the lower board 400 and upper board 500; however, the disclosure is not intended to be limited to a lower board 400 and upper board 500. For example, a 3D circuit board can have a single lever or more than two levels.

Independent of the number of levels in the circuit board 700, the circuit board 700 includes at least two electrical circuits having different voltages, where each of the electrical circuits is electrically connected to the chargers 501, 503, 505, and 506. One of the two circuits is for providing power to and using power from the batteries in the battery pack 300 that is onboard the mobile power system 1000, and the other of the two circuits is for providing power to and using power from the vehicle battery 704 (e.g., a battery for an ICE vehicle or a battery pack for an electric vehicle).

The first voltage circuit having a first voltage, e.g., a 24V circuit having 24V, includes the battery pack 300, the 24V bus bars 406/407, the battery monitor device 405, the control computer 502, the 24V to 12V chargers 501/503, the 12V to 24V chargers 505/506, the solar charge controller 504, and the combination inverter charger 600. The first voltage circuit can optionally include the circuit breaker 404. In the first voltage circuit, power is provided to and used from the battery pack 300.

The second voltage circuit having a second voltage, e.g., a 12V circuit having 12V, includes the 12V bus bars 402/403/408/409, the 24V to 12V chargers 501/503, and the 12V to 24V chargers 505/506. The second voltage circuit can optionally include the circuit breaker 410. In the second voltage circuit, power is provided to and used from the vehicle battery 704.

In operation when connected to an external or outside power source such as the grid 701 or a generator 702, a first 120V power supply flows from the grid 701 and/or generator 702 to the combination inverter charger 600, optionally via the circuit breaker 601. The combination inverter charger 600 provides a second 120V power supply to the electrical outlet 602, optionally via circuit breaker 603. Circuit breaker 603 is configured to electrically connect or disconnect the combination inverter charger 600 from the outlet 602 and can be mounted anywhere in the mobile power system 1000 such that the circuit breaker 603 is electrically coupled between the outlet 602 and the combination inverter charger 600. The combination inverter charger 600 also converts the first 120V power supply to a first voltage power supply (e.g., 24V power supply) that is provided to the circuit board 700, and particularly, to a first voltage bus bar (e.g., 24V bus bar 406/407). The first voltage power supply flows from the first voltage bus bar to i) the battery pack 300, optionally via circuit breaker 404, ii) the first voltage to second voltage chargers 501/503, and iii) the control computer 502, the solar charge controller 504, and the battery monitor device 405. A second voltage power supply can flow from the first voltage to second voltage chargers 501/503 to the vehicle battery 704 via the second voltage bus bar 402/403/408/409 and via an optional circuit breaker 410. Flow of power to the battery pack 300 and to the vehicle battery 704 charges the batteries in the battery pack 300 and the vehicle battery 704.

In operation when not connected to an external or outside power source such as the grid 701, generator 702, or solar panel 703, a battery pack power supply flows from the battery pack 300 to the combination inverter charger 600 via the first voltage bus bar 406/407 and optionally via the circuit breaker 404. The battery pack power supply also flows to i) the control computer 502, the solar charge controller 504, and the battery monitor device 405, and ii) the first voltage to second voltage chargers 501/503. A second voltage power supply can flow from the first voltage to second voltage chargers 501/503 to the vehicle battery 704 via the second voltage bus bar 402/403/408/409 and via an optional circuit breaker 410. Flow of power to the vehicle battery 704 charges the vehicle battery 704. The combination inverter charger 600 receives the battery pack power supply from the first voltage bus bar 406/407 and converts the battery pack power supply to the second 120V power supply that is provided to the electrical outlet 602 optionally via circuit breaker 603.

The solar power supply can be used alone or in combination with the other external or outside sources of power 701 and 702. In operation when connected to the solar panel 703 and the solar panel 703 supplies solar power to the mobile power system 1000, solar power flows to the solar charge controller 504. The solar charge controller 504 provides a solar-based first voltage power supply to the first voltage bus bar 406/407.

In aspects where power supply is provided from external sources 701 and 702 and the solar panel 703, the solar-based first voltage power supply flows from the first voltage bus bar 406/407 to i) the battery pack 300, optionally via circuit breaker 404, ii) the first voltage to second voltage chargers 501/503, and iii) the control computer 502, the solar charge controller 504, and the battery monitor device 405. A second voltage power supply generated from the solar-based first voltage power supply can flow from the first voltage to second voltage chargers 501/503 to the vehicle battery 704 via the second voltage bus bar 402/403/408/409 and via an optional circuit breaker 410. Flow of power to the battery pack 300 and to the vehicle battery 704 charges the batteries in the battery pack 300 and the vehicle battery 704.

In aspects where power is not supplied from external sources 701 and 702 and is supplied from the solar panel 703, the solar-based first voltage power supply can flow from the first voltage bus bar 406/407 to i) the battery pack 300, optionally via circuit breaker 404, ii) the first voltage to second voltage chargers 501/503, and iii) the control computer 502, the solar charge controller 504, and the battery monitor device 405. A second voltage power supply generated from the solar-based first voltage power supply can flow from the first voltage to second voltage chargers 501/503 to the vehicle battery 704 via the second voltage bus bar 402/403/408/409 and via an optional circuit breaker 410. Flow of power to the battery pack 300 and to the vehicle battery 704 charges the batteries in the battery pack 300 and the vehicle battery 704. Additionally, the solar-based first voltage power supply can flow from the first voltage bus bar 406/407 to the combination inverter charger 600. The combination inverter charger 600 receives the solar-based first voltage power supply from the first voltage bus bar 406/407 and converts the solar-based first voltage power supply to the second 120V power supply that is provided to the electrical outlet 602 optionally via circuit breaker 603.

Figure 8:
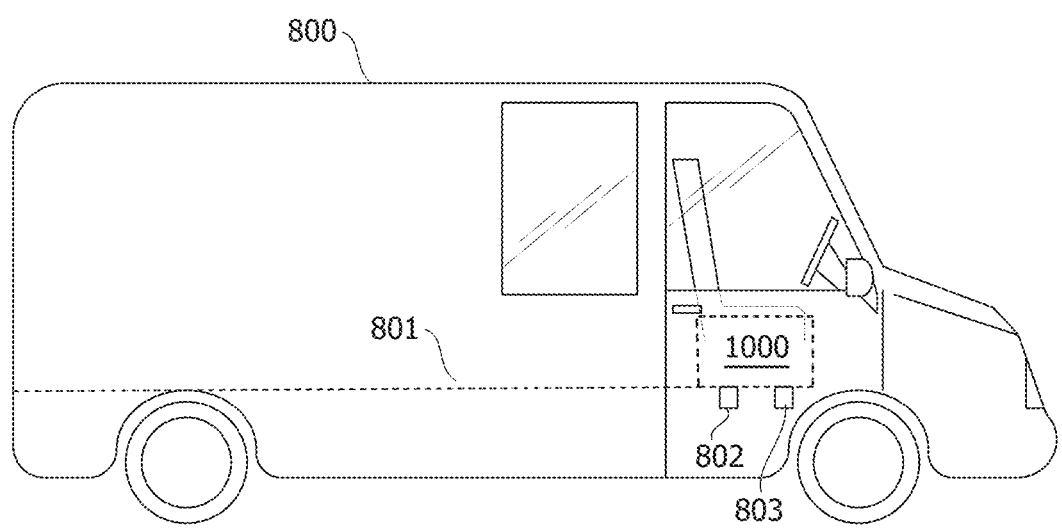
FIG. 8 illustrates a side view of a van having the mobile power system connected to seat mounts in the van.

FIG. 8 illustrates a side view of a van 800 (example of a vehicle) having the mobile power system 1000 inside. The mobile power system 1000 can be seen sitting on the floor 801 of the van 800; thus, the batteries of the mobile power system 1000 are above the floor 801 of the van 800. The base of the mobile power system 1000 can be seen connected to seat mounts 802 and 803 in the vehicle van 800. While shown connected to the seat mounts 802 and 803 of the van 800 in the front passenger seat space, it is contemplated that the mobile power system 1000 can be connected to seat mounts at any other location in the van 800 where seat mounts are present.

ASPECTS

Aspect 1. A mobile power system for equipment in a vehicle, comprising: a base; a battery pack comprising a plurality of rechargeable batteries placed on the base; an equipment cage connected to the base, wherein the equipment cage comprises a mounting member; a circuit board connected to the equipment cage above the battery pack, wherein the circuit board comprises a first electrical circuit operating at a first voltage, a second electrical circuit operating at a second voltage, and a plurality of chargers, wherein each of the plurality of chargers is electrically connected to the first electrical circuit and to the second electrical circuit, wherein the battery pack is electrically coupled to the first electrical circuit, wherein the second electrical circuit is configured to electrically connect to a vehicle battery; and a combination inverter charger placed on a mounting member of the equipment cage above the battery pack and to a side of the circuit board, wherein the combination inverter charger is electrically connected to the first electrical circuit and is configured to i) provide a first voltage power supply to charge the plurality of rechargeable batteries in the battery pack via the first electrical circuit, ii) receive a battery pack power supply from the battery pack via the first electrical circuit, and iii) provide a first 120V power supply to the equipment in the vehicle.

Aspect 2. The mobile power system of Aspect 1, wherein the combination inverter charger is further configured to i) receive a second 120V power supply from a grid connection or from a generator, and ii) convert the second 120V power supply to the first voltage power supply and to the first 120V power supply.

Aspect 3. The mobile power system of Aspect 1 or 2, wherein the combination inverter charger is further configured to convert the battery pack power supply to the first 120V power supply.

Aspect 4. The mobile power system of any of Aspects 1 to 3, wherein the circuit board further comprises: a first voltage bus bar located in the first electrical circuit; and a second voltage bus bar located in the second electrical circuit, wherein each of the plurality of chargers is electrically connected to the first voltage bus bar and to the second voltage bus bar.

Aspect 5. The mobile power system of any of Aspects 1 to 4, wherein the plurality of chargers comprises: a first voltage to second voltage charger configured to provide a second voltage power supply via the second voltage bus bar using the first voltage power supply received from the first voltage bus bar; and a second voltage to first voltage charger configured to charge the plurality of rechargeable batteries in the battery pack via the first voltage bus bar using a second voltage power supply received from the second voltage bus bar.

Aspect 6. The mobile power system of any of Aspects 1 to 5, wherein the circuit board further comprises: a control computer located in the first electrical circuit and electrically connected to the first voltage bus bar and operably connected to the combination inverter charger, wherein the control computer is configured to monitor a plurality of parameters of the combination inverter charger.

Aspect 7. The mobile power system of any of Aspects 1 to 6, wherein the circuit board further comprises: a battery monitor device located in the first electrical circuit and electrically connected to the first voltage bus bar and operably connected to the control computer, wherein the control computer is configured to receive a signal from the battery monitor device that indicates a battery status of the plurality of rechargeable batteries and to track the battery status over time.

Aspect 8. The mobile power system of any of Aspects 1 to 7, wherein the battery monitor device comprises a shunt and a shunt computer connected to the shunt, wherein the shunt computer is operably connected to the control computer.

Aspect 9. The mobile power system of any of Aspects 1 to 8, wherein the circuit board further comprises: a solar charge controller located in the first electrical circuit and electrically coupled to the first voltage bus bar and operably connected to the control computer, wherein the solar charge controller is configured to i) receive a solar power supply and ii) control a flow of the solar power supply to the first voltage bus bar, wherein the control computer is configured to receive a signal from the solar charge controller that indicates solar power usage over time and to track the solar power usage.

Aspect 10. The mobile power system of any of Aspects 1 to 9, wherein the circuit board further comprises: a lower board, an upper board, and spacers positioned between the lower board and the upper board, wherein the lower board contains at least a portion of the first electrical circuit and at least a portion of the second electrical circuit.

Aspect 11. The mobile power system of any of Aspects 1 to 10, wherein each of the plurality of chargers is located on the upper board.

Aspect 12. The mobile power system of any of Aspects 1 to 11, wherein the circuit board further comprises: a first circuit breaker configured to electrically connect or disconnect the battery pack and the first electrical circuit; and a second circuit breaker configured to electrically connect or disconnect a vehicle battery of the vehicle and the second electrical circuit.

Aspect 13. The mobile power system of any of Aspects 1 to 12, wherein the equipment cage comprises horizontal members and vertical members, wherein each of the horizontal members connects to two of the vertical members.

Aspect 14. The mobile power system of any of Aspects 1 to 13, wherein the base is configured to connect to a seat mount of a vehicle.

Aspect 15. The mobile power system of any of Aspects 1 to 14, further comprising a top cover having a circuit breaker and a 120V outlet placed therein, wherein the circuit breaker is configured to connect or disconnect the combination inverter charger and an external power supply, wherein the 120V outlet is electrically connected to the combination inverter charger and configured to receive the first 120V power supply from the combination inverter charger.

Aspect 16. The mobile power system of any of Aspects 1 to 15, further comprising: side walls attached to a perimeter of the equipment cage, wherein the side walls, the top cover, and the base are configured to enclose the battery pack, the circuit board, and the combination inverter charger.

Aspect 17. The mobile power system of any of Aspects 1 to 16, wherein the circuit board is not made from silicon wafers.

Aspect 18. The mobile power system of any of Aspects 1 to 17, wherein electrical components of the circuit board are connected by wires that are not encased in the circuit board.

Aspect 19. The mobile power system of any of Aspects 1 to 18, further comprising the vehicle.

Aspect 20. The mobile power system of any of Aspects 1 to 19, wherein the vehicle comprises seat mounts, wherein the base is connected to the seat mounts.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A mobile power system for equipment in a vehicle, comprising:
    a base;
    a battery pack comprising a plurality of rechargeable batteries placed on the base;
    an equipment cage connected to the base, wherein the equipment cage comprises a mounting member;
    a circuit board connected to the equipment cage above the battery pack, wherein the circuit board comprises a first electrical circuit operating at a first voltage, and
    a combination inverter charger placed on a mounting member of the equipment cage above the battery pack and to a side of the circuit board, wherein the combination inverter charger is electrically connected to the first electrical circuit and is configured to i) provide a first voltage power supply to charge the plurality of rechargeable batteries in the battery pack via the first electrical circuit, ii) receive a battery pack power supply from the battery pack via the first electrical circuit, and iii) provide a first 120V power supply to the equipment in the vehicle.

2. The mobile power system of claim 1, wherein the combination inverter charger is further configured to i) receive a second 120V power supply from a grid connection or from a generator, and ii) convert the second 120V power supply to the first voltage power supply and to the first 120V power supply.

3. The mobile power system of claim 1, wherein the combination inverter charger is further configured to convert the battery pack power supply to the first 120V power supply.

4. The mobile power system of claim 1, wherein the circuit board further comprises:
    a first voltage bus bar located in the first electrical circuit;
    a second electrical circuit operating at a second voltage;
    a second voltage bus bar located in the second electrical circuit;
    a plurality of chargers; and
    wherein each of the plurality of chargers is electrically connected to the first voltage bus bar and to the second voltage bus bar.

5. The mobile power system of claim 4, wherein the plurality of chargers comprises:
    a first voltage to second voltage charger configured to provide a second voltage power supply via the second voltage bus bar using the first voltage power supply received from the first voltage bus bar; and
    a second voltage to first voltage charger configured to charge the plurality of rechargeable batteries in the battery pack via the first voltage bus bar using a second voltage power supply received from the second voltage bus bar.

6. The mobile power system of claim 4, wherein the circuit board further comprises:
    a control computer located in the first electrical circuit and electrically connected to the first voltage bus bar and operably connected to the combination inverter charger, wherein the control computer is configured to monitor a plurality of parameters of the combination inverter charger.

7. The mobile power system of claim 6, wherein the circuit board further comprises:
    a battery monitor device located in the first electrical circuit and electrically connected to the first voltage bus bar and operably connected to the control computer, wherein the control computer is configured to receive a signal from the battery monitor device that indicates a battery status of the plurality of rechargeable batteries and to track the battery status over time.

8. The mobile power system of claim 7, wherein the battery monitor device comprises a shunt and a shunt computer connected to the shunt, wherein the shunt computer is operably connected to the control computer.

9. The mobile power system of claim 6, wherein the circuit board further comprises:
    a solar charge controller located in the first electrical circuit and electrically coupled to the first voltage bus bar and operably connected to the control computer, wherein the solar charge controller is configured to i) receive a solar power supply and ii) control a flow of the solar power supply to the first voltage bus bar, wherein the control computer is configured to receive a signal from the solar charge controller that indicates solar power usage over time and to track the solar power usage.

10. The mobile power system of claim 1, wherein the circuit board further comprises:
    a lower board, an upper board, and spacers positioned between the lower board and the upper board, wherein the lower board contains at least a portion of the first electrical circuit and at least a portion of the second electrical circuit.

11. The mobile power system of claim 10, wherein each of the plurality of chargers is located on the upper board.

12. The mobile power system of claim 4, wherein the circuit board further comprises:
    a first circuit breaker configured to electrically connect or disconnect the battery pack and the first electrical circuit; and
    a second circuit breaker configured to electrically connect or disconnect a vehicle battery of the vehicle and the second electrical circuit.

13. The mobile power system of claim 1, wherein the equipment cage comprises horizontal members and vertical members, wherein each of the horizontal members connects to two of the vertical members.

14. The mobile power system of claim 1, wherein the base is configured to connect to a seat mount of a vehicle.

15. The mobile power system of claim 1, further comprising a top cover having a circuit breaker and a 120V outlet placed therein, wherein the circuit breaker is configured to connect or disconnect the combination inverter charger and an external power supply, wherein the 120V outlet is electrically connected to the combination inverter charger and configured to receive the first 120V power supply from the combination inverter charger.

16. The mobile power system of claim 15, further comprising:
    side walls attached to a perimeter of the equipment cage, wherein the side walls, the top cover, and the base are configured to enclose the battery pack, the circuit board, and the combination inverter charger.

17. The mobile power system of claim 1, wherein the circuit board is not made from silicon wafers.

18. The mobile power system of claim 1, wherein electrical components of the circuit board are connected by wires that are not encased in the circuit board.

19. The mobile power system of claim 1, further comprising the vehicle.

20. The mobile power system of claim 19, wherein the vehicle comprises seat mounts, wherein the base is connected to the seat mounts.

* * * * *